(12) United States Patent
Chowdhury et al.

(10) Patent No.: US 9,054,807 B2
(45) Date of Patent: Jun. 9, 2015

(54) REDUCING CROSSTALK IN OPTICAL WAVELENGTH CONVERTERS

(75) Inventors: Aref Chowdhury, Springfield, NJ (US); Gregory Raybon, Shrewsbury, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1690 days.

(21) Appl. No.: 11/138,007

(22) Filed: May 26, 2005

(65) Prior Publication Data
US 2006/0269292 A1 Nov. 30, 2006

(51) Int. Cl.
*H04B 10/2513* (2013.01)

(52) U.S. Cl.
CPC .................................. *H04B 10/2513* (2013.01)

(58) Field of Classification Search
USPC ...................................... 398/81, 180; 359/326
See application file for complete search history.

(56) References Cited

U.S. PATENT DOCUMENTS

| 5,193,023 | A | 3/1993 | Yamada et al. | 359/245 |
|---|---|---|---|---|
| 5,355,247 | A | 10/1994 | Byer et al. | 359/330 |
| 5,475,526 | A | 12/1995 | Byer et al. | 359/330 |
| 5,754,334 | A | 5/1998 | Artiglia et al. | 359/332 |
| 6,013,221 | A | 1/2000 | Byer et al. | 264/436 |
| 6,459,525 | B1 | 10/2002 | Aso et al. | 359/332 |
| 6,555,293 | B1 | 4/2003 | Fejer et al. | 430/311 |
| 6,631,246 | B2 | 10/2003 | Ford et al. | 398/158 |
| 6,704,519 | B1 | 3/2004 | Brener et al. | 398/160 |
| 6,748,142 | B2 | 6/2004 | Madsen | 385/49 |
| 6,751,421 | B1 | 6/2004 | Ranka et al. | 398/141 |
| 6,807,321 | B2 | 10/2004 | Madsen | 385/11 |
| 6,856,450 | B2 | 2/2005 | Chowdhury et al. | 359/326 |
| 7,034,994 | B2 * | 4/2006 | McNicol | 359/337.5 |
| 7,155,095 | B2 * | 12/2006 | Aso et al. | 385/123 |
| 7,310,318 | B1 * | 12/2007 | Frankel et al. | 370/252 |
| 2001/0053012 | A1 | 12/2001 | Shikata | 359/184 |
| 2003/0035618 | A1 | 2/2003 | Watanabe | 385/24 |
| 2003/0039006 | A1 | 2/2003 | Carbone et al. | 359/124 |

(Continued)

FOREIGN PATENT DOCUMENTS

| EP | 0 862 078 A1 | 9/1998 | G02F 1/35 |
|---|---|---|---|
| EP | 1 076 428 A2 | 2/2001 | H04B 10/17 |

(Continued)

OTHER PUBLICATIONS

S. Set et al., "The Impact of Pulse Dispersion in Ultrafast Wavelength Converters Based on Fiber Four-Wave Mixing", CLEO '99, May 23-28, 1999.*

(Continued)

*Primary Examiner* — Shi K Li
(74) *Attorney, Agent, or Firm* — John F. McCabe (57) ABSTRACT

An optical fiber transmission system includes a series of optical fiber transmission spans and one or more all-optical signal processors. The optical fiber transmission spans are connected to form an optical communication path. Each all-optical signal processor directly connects a corresponding adjacent pair of the spans. Each all-optical signal processor includes an optical wavelength converter having input and output ports and a dispersion adjustment module connected to the input port of the optical wavelength converter of the same processor. The dispersion module is also configured to adjust cumulative dispersions of some received optical pulses to be outside of a range for the cumulative dispersions of corresponding optical pulses in the span directly preceding the same processor.

18 Claims, 6 Drawing Sheets

(56) References Cited

U.S. PATENT DOCUMENTS

2004/0047636 A1    3/2004    Guild et al. .................. 398/147
2004/0184698 A1    9/2004    Watanabe ........................ 385/11
2005/0063632 A1*   3/2005    Bhowmik ........................ 385/8

FOREIGN PATENT DOCUMENTS

| JP | 9-127563 | 5/1997 |
| --- | --- | --- |
| JP | 2001-75136 | 3/2001 |
| JP | 2001-103014 | 4/2001 |
| JP | 2001-285198 | 10/2001 |
| JP | 2004-4870 | 1/2004 |
| WO | WO98/08138 | 2/1998 |

OTHER PUBLICATIONS

H. Poulsen et al., "Assessment of Signal Quality in 10 Gbit/s All-Optical Networks with Wavelength Converters", ECOC '98, Sep. 24-24, 1998.*
PCT International Search Report dated Aug. 17, 2006, (PCT/US2006/016489) 4 pages.
U.S. Appl. No. 10/259,051, filed Sep. 27, 2002, Aref Chowdhury, et al.
U.S. Appl. No. 10/442,287, filed May 20, 2003, Aref Chowdhury, et al.
U.S. Appl. No. 10/441,532, filed May 20, 2003, Aref Chowdhury, et al.
U.S. Appl. No. 10/729,153, filed Dec. 5, 2003, Aref Chowdhury, et al.
U.S. Appl. No. 10/835,753, filed Apr. 30, 2004, Aref Chowdhury, et al.
U.S. Appl. No. 10/932,980, filed Sep. 2, 2004, Aref Chowdhury, et al.
U.S. Appl. No. 10/082,870, filed Feb. 25, 2002, Mark A. Schnitzer.
Martin M. Fejer, et al, "Quasi-Phase-Matched Second Harmonic Generation: Tuning and Tolerances," *IEEE Journal of Quantum Electronics*, vol. 28, No. 11, (11/92), pp. 2631-2654.
B. Mikkelsen, et al, "Reduction of Crosstalk in Semiconductor Optical Amplifiers by Amplifying Dispersed WDM Signals (7 ×20 Gb/s)," *OFC 2000*, Baltimore, MD, (3/7-10/00), Paper No. ThJ5, 5 pages.
A. Chowdhury, et al, "Compensation of Intra-channel Nonlinearities in 40 Gb/s Pseudo-Linear Systems Using Optical Phase Conjugation," *Optical Fiber Communication Conference 2004*, Los Angeles, CA, Paper PDP32 (2/22-27/04), 4 pages.
A. Chowdhury, et al, "Optical Phase Conjugation in a WDM CSRZ Pseudo-Linear 40 Gb/s System for 4,800 km Transmission," *European Conference on Optical Communication 2004*, Stockholm, Sweden, Paper Th4.5.6, (9/5-9/04), 2 pages.
A. Chowdhury, et al, "Optical Phase Conjugation and Pseudolinear Transmission," *Optics Letters,* 2004, Optical Society of America, vol. 29, No. 10, pp. 1105-1107.

* cited by examiner

FIG. 7D ered that are less than about $4 \times 10^5$ or $2.0 \times 10^5$ divided the square of the per channel bit-rate in Gb/s.

In some of the systems, each all-optical processor also has a second dispersion adjustment module that is configured to receive wavelength-converted optical pulses from the output port of the optical wavelength converter therein. Each second dispersion adjustment module is configured to reset cumulative dispersions of some of the received wavelength-converted optical pulses to be within ranges for cumulative dispersions of corresponding optical pulses in the two spans directly connected by the same processor.

In a second aspect, an optical fiber transmission system includes a series of optical fiber transmission spans connected to form an optical communication path and one or more all-optical signal processors. Each all-optical signal processor directly connects a corresponding pair of adjacent ones of the spans. Each processor includes an optical wavelength converter having optical input and output ports. Each processor includes a dispersion adjustment module configured to transmit received optical pulses to the input port of the wavelength converter therein. The dispersion adjustment module is configured to adjust cumulative dispersions of some received optical pulses to have values in ps/nm that are greater than about $0.25 \times 10^5$ divided by the square of the per wavelength-channel bit-rate in Gb/s.

In some such systems, the dispersion adjustment module is configured to adjust cumulative dispersions of some of the received optical pulses to have values in ps/nm that are less than about $4.0 \times 10^5$ or $2.0 \times 10^5$ divided by the square of the per channel bit-rate in Gb/s. The dispersion module may also be configured to adjust cumulative dispersions of some of the received optical pulses to have values in ps/nm that are greater than about $0.25 \times 10^5$ divided by the square of the per wavelength-channel bit-rate in Gb/s.

In the first and second aspects, various ones of the above systems may be WDM optical transmission systems.

In a third aspect, various embodiments feature an apparatus that includes an optical wavelength converter and first and second lumped modules for providing variable dispersion adjustments. The first module to provide a variable dispersion adjustment is serially connected to an input port of the optical wavelength converter. The second module to provide a variable dispersion adjustment module is serially connected to an output port of the optical wavelength converter.

In some embodiments of the apparatus, the wavelength converter is configured to wavelength convert a plurality of WDM wavelength-channels.

In some embodiments of the apparatus, the lumped modules are capable of changing magnitudes of cumulative dispersions of optical pulses at some telecommunications wavelengths by at least 50 ps/nm or by at least 100 ps/nm.

In some embodiments, the linear dimensions of the apparatus in 3-dimensional space are smaller than 10 meters.

REDUCING CROSSTALK IN OPTICAL WAVELENGTH CONVERTERS

BACKGROUND

1. Field of the Invention

The invention relates to optical wavelength converters and methods and optical communication systems that use optical wavelength converters.

2. Discussion of the Related Art

Wavelength-division multiplexed (WDM) optical communication systems may advantageously incorporate optically pumped nonlinear optical devices such as optical wavelength converters and/or optical phase conjugators. As a first example, a WDM optical fiber line may incorporate an optical wavelength converter between adjacent optical fiber spans to enable the transfer of optical communications to different wavelength-channels in the adjacent fiber spans. The ability to change the wavelength-channel between adjacent fiber spans enables a more efficient use of the bandwidth in each fiber span of the WDM optical communication system. As a second example, a long-haul WDM optical fiber line may incorporate an optical phase conjugator. A suitably positioned optical phase conjugator can partially undo the pulse degradation due to nonlinear optical effects when optical pulses travel along a long optical transmission line. While such optically pumped nonlinear optical devices may have characteristics that make their incorporation into WDM optical fiber lines desirable, improvements to these nonlinear optical devices may be useful.

BRIEF SUMMARY

Various embodiments provide optical wavelength converters that are adapted to generate reduced crosstalk between optical pulses in different wavelength-channels. In WDM communication systems, reducing the generation of such inter-channel crosstalk in optically pumped nonlinear optical devices is often desirable.

In a first aspect, an optical fiber transmission system includes a series of optical fiber transmission spans and one or more all-optical signal processors. The optical fiber transmission spans are connected to form an optical communication path. Each all-optical signal processor directly connects a corresponding adjacent pair of the spans. Each all-optical signal processor includes an optical wavelength converter having input and output ports and a dispersion adjustment module connected to the input port of the optical wavelength converter of the same processor. The dispersion module is also configured to adjust cumulative dispersions of some received optical pulses to be outside of a range for the cumulative dispersions of corresponding optical pulses in the span directly preceding the same processor.

In some of the systems, the dispersion adjustment module is configured to adjust cumulative dispersions of some received optical pulses to values outside of a range for the cumulative dispersions of corresponding optical pulses in the span directly following the same processor in the series.

In some of the systems, the dispersion adjustment module is configured to adjust cumulative dispersions of some received optical pulses to have values in pico-seconds per nanometer (ps/nm) that are greater than about $0.25 \times 10^5$ or $0.5 \times 10^5$ divided by the square of the per channel bit-rate in giga-bits per second (Gb/s). The dispersion adjustment module may also be configured to adjust cumulative dispersions of the some received optical pulses to have values in ps/nm

BRIEF DESCRIPTION OF THE DRAWINGS

Various embodiments are described more fully by the Figures and Detailed Description of Illustrative Embodiments. Nevertheless, the inventions may be embodied in various forms and are not limited to embodiments described in the Figures and/or Detailed Description of Illustrative Embodiments.

In the Figures and text, like reference numerals indicate elements with similar functions.

DETAILED DESCRIPTION OF ILLUSTRATIVE EMBODIMENTS

Various embodiments relate to apparatus and methods that produce optical wavelength-conversion with reduced crosstalk due to nonlinear optical effects. To better illustrate the fabrication and operation of the embodiments, it is convenient to first illustrate one source of optical crosstalk in optical wavelength-conversion.

Figure 1:
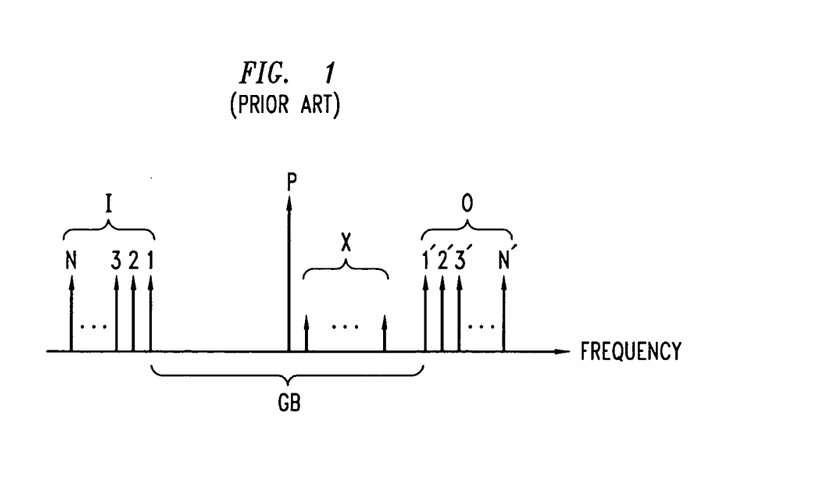
FIG. 1 schematically shows spectra of input wavelength-channels, output wavelength-channels and crosstalk light in a conventional optical wavelength converter.

FIG. 1 schematically illustrates an output spectrum that could be observed after conventional wavelength-conversion of light received from a WDM fiber communication line. The input spectrum is formed by light in multiple wavelength-channels. The output spectrum is formed of several component spectra I, O, and P. Component spectrum I corresponds to light of input wavelength-channels and includes a sequence of amplitude peaks $1, 2, 3, \ldots$, and N at frequencies $f_1, f_2, f_3, \ldots$, and $f_N$, respectively. The component spectrum O corresponds to the desired wavelength-converted output light and includes a sequence of amplitude peaks $1', 2', 3', \ldots$, and N' at frequencies $2f_P-f_1, 2f_P-f_2, 2f_P-f_3, \ldots$, and $2f_P-f_N$ for the several wavelength-channels. The component spectrum P corresponds to the pump light in the optical wavelength converter. The amplitude peaks of the component spectrum O are the desired output spectrum, which is, e.g., symmetrically reflected about the center frequency $f_p$ of the pump spectrum, P.

In addition to the component spectra I, O, P, the output spectrum also includes a component spectrum, X, corresponding to light produced by inter-channel crosstalk in the optical wavelength converter. In the component spectrum X, each amplitude peak is formed by a nonlinear wavelength-conversion that simultaneously involves the light from two or more different input wavelength-channels. For example, input light of two different frequency wavelength-channels $f_i$ and $f_j$ may produce wavelength-converted light at the frequencies $f_p \pm (f_i \pm f_j)$ and also, e.g., $f_i \pm f_j \pm f_k$ due to inter-channel optical crosstalk in the optical wavelength converter. Such optical crosstalk produces sequences of undesired amplitude peaks in the output spectrum of a conventional optical wavelength converter.

In the component spectra, X, associated with inter-channel crosstalk, the intensities of amplitude peaks are proportional to intensities of the peaks in two input optical wavelength-channels. Since the intensities of the input optical wavelength-channels are typically weaker than the intensity of pump light in a wavelength converter, the component spectra, X, produced by such crosstalk is typically relatively weak. Nevertheless, the amplitude peaks of the component spectra, X, can cause optical data detection errors and are thus, undesirable.

One conventional method for reducing the above-described effects of crosstalk in optical wavelength converters involves using a large guard band, GB. The guard band is a frequency band about pump frequency, $f_p$, which is not used for input or output wavelength-channels I, O. Indeed, the most important crosstalk-produced component spectra are typically located at frequencies close to the pump frequency $f_p$ of the wavelength converter. For that reason, a large guard band GB can separate such undesired crosstalk-produced spectra from the desired wavelength-converted output component spectra, O. If the guard band GB is large enough, crosstalk-produced component spectra, X, will not overlap output wavelength-channels of the desired output component spectra, O, and thus, will not cause optical transmission errors. Unfortunately, using a large guard band GB wastes a frequency region that could otherwise be used for more optical communication wavelength-channels.

In contrast, various embodiments herein reduce undesired effects of such crosstalk-produced component spectra by adjusting cumulative dispersions of optical pulses at the inputs of wavelength converters. The dispersion adjustments cause peak amplitudes of crosstalk-produced component spectra to be reduced relative to peak amplitudes of desired output component spectra of the optical wavelength converters. Such relative spectral reduction is possible, because peak amplitudes of the desired output component spectra, O, and the crosstalk-produced component spectra, X, grow differently with the peak amplitudes in the input spectra, I, of the optical wavelength converter. In the desired output component spectra, O, the peak amplitudes are proportional to peak amplitudes in the input component spectra, I. In the undesired crosstalk-produced component spectra, X, the peak amplitudes are proportional to products of peak amplitudes from the input component spectra, I. For that reason, reducing the peak amplitudes of the input multi-channel spectra, I, during the optical wavelength-conversion reduces the production of inter-channel crosstalk with respect to the production of desired wavelength-converted output light.

Figure 2:
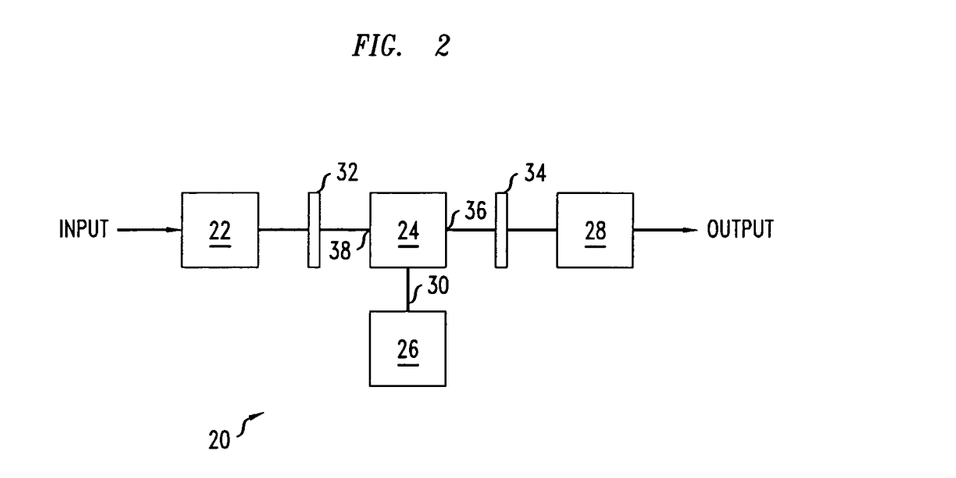
FIG. 2 is a block diagram for an embodiment of an optical wavelength converter that is configured to reduce generation of optical crosstalk therein.

FIG. 2 shows an apparatus 20 that exploits dispersion management to reduce the relative amplitude of the crosstalk-produced component of the output spectrum during wavelength-conversion. The apparatus 20 includes a first lumped dispersion adjustment module 22, an optical wavelength converter 24, an optical pump source 26, and a second lumped dispersion adjustment module 28. The apparatus 20 includes an optical fiber or waveguide 30, one or more output optical filters 34, and optionally an input optical filter 32.

The first lumped dispersion adjustment module 22 substantially changes magnitudes of cumulative dispersions of received optical pulses in a selected wavelength range. Exemplary lumped modules 22 change cumulative dispersions of optical pulses at some telecommunications wavelengths by 50 or more pico-seconds/nanometer (ps/nm) or even by 100 ps/nm or more. The first lumped dispersion adjustment module 22 may be configured to increase or decrease magnitudes of cumulative dispersions of said optical pulses.

The first lumped dispersion adjustment module 22 may be formed from a variety of devices. One exemplary device is a roll of single-mode optical fiber that has an ordinary or anomalous dispersion. Another exemplary device is an optical path that includes a diffraction grating and one or more mirrors, wherein the path is configured to cause light to undergo a double-pass reflection off the diffraction grating thereby producing a cumulative dispersion change. One such device is described in U.S. patent application Ser. No. 10/082, 870, filed Feb. 25, 2002 by Mark J. Schnitzer, which is incorporated by reference herein in its entirety. Other exemplary devices include a fiber Bragg grating. In light of the above-disclosure, those of skill in the art would be able to make exemplary devices for the first lumped dispersion-change module 22.

Exemplary first lumped dispersion adjustment module 22 may also be dispersion-tunable, i.e., tunable to provide a range of choices for the cumulative dispersion change to optical pulses of a given center wavelength. Such a tunable first lumped module 22 can be configured to provide different changes to cumulative dispersions when installed at different points along an optical fiber communication line. Exemplary tunable first lumped dispersion adjustment modules 22 are mechanically tunable. For example, in a device that uses a double-pass reflection off the grating to change cumulative dispersions, the mechanical tuning may involve adjusting the incidence angle of optical pulses on the diffraction grating to change the cumulative dispersion produced by the device. Other exemplary lumped dispersion adjustment module 22 are electrically, optically, or thermally tunable. For example, the device may include an optical waveguide that changes cumulative dispersions of optical pulses propagating there through, and dispersion-tuning may involve applying heat, a voltage, or an optical signal to the medium of the waveguide to change the medium's refractive index. Other exemplary devices include fiber Bragg grating devices that are thermally or electrically tunable. Exemplary devices capable of providing tunable amounts of change to cumulative dispersions of received optical pulses may, e.g., be described in one or more of U.S. Pat. Nos. 6,631,246; 6,748,142; and 6,807,321, which are all incorporated herein by reference in their entirety.

The optical wavelength converter 24 converts the wavelengths of optical pulses received from the first dispersion-change module 22 via a process that involves optical pumping. The optical wavelength converter 24 may produce an optical phase conjugation, which inverts the cumulative dispersions of received optical pulses. Exemplary optical wavelength converters 24 include periodically poled lithium niobate waveguides, periodically striped gallium arsenide waveguides, and periodically polarization-striped group III-nitride waveguides, which implement quasi-phase matching. Other exemplary optical wavelength converters include semiconductor optical amplifiers and highly nonlinear optical fibers. The wavelength-conversion may involve first or higher harmonic generation, parametric light generation, optical phase conjugation, etc. Examples of optical wavelength converters and fabrication methods for such devices are described in one or more of: U.S. patent application Ser. No. 10/259,051, filed Sep. 27, 2002, by A. Chowdhury et al.; U.S. patent application Ser. No. 10/835,753, filed Apr. 30, 2004 by A. Chowdhury et al; and U.S. Pat. Nos. 5,193,023; 5,355,247; 5,475,526; 6,013,221; 6,555,293; and 6,856,450. These U.S. patent applications and patents are incorporated herein by reference in their entirety.

The pump source 26 transmits pump light, e.g., intense monochromatic laser light, to optical fiber or waveguide 30. The optical fiber or waveguide 30 delivers the pump light to the optical wavelength converter 24 where the pump light causes the optical wavelength-conversion. Some embodiments may include multiple optical pump sources (not shown).

The second lumped dispersion adjustment module 28 also substantially changes magnitudes of cumulative dispersions of the received wavelength-converted optical pulses. For example, the second lumped dispersion adjustment module 28 may approximately compensate cumulative dispersion changes that are produced in other parts of the apparatus 20, i.e., in the first lumped dispersion adjustment module 22 and the optical wavelength converter 24.

The second lumped dispersion adjustment module 28 also substantially changes magnitudes of cumulative dispersions of some or all of the received optical pulses. Exemplary lumped dispersion adjustment modules 28 can change cumulative dispersions of optical pulses at some telecommunications wavelengths by 50 or more ps/nm or even by 100 or more ps/nm. The second lumped dispersion adjustment module 28 may increase or decrease magnitudes of cumulative dispersions of said optical pulses, e.g., to approximately compensate other changes to the cumulative dispersions produced by the first lumped dispersion adjustment module 22 and the optical wavelength converter 24.

A variety of devices may function as the second lumped dispersion adjustment module 28. One exemplary device is a roll of single-mode optical fiber with an ordinary or anomalous dispersion. Another exemplary device includes a fiber Bragg grating. Another exemplary device includes an optical path that has a diffraction grating and one or more mirrors or other optical elements that cause light to undergo a double-pass reflection off the diffraction grating thereby producing a cumulative dispersion change. In light of the above-disclosure, those of skill in the art would know the fabrication of the second lumped dispersion adjustment module 28.

Exemplary second lumped dispersion adjustment modules 28 may also be dispersion-tunable to enable selecting a range of changes to the magnitude of the cumulative dispersion for optical pulses of a given center wavelength. Exemplary tunable second lumped dispersion adjustment modules 28 are mechanically, electrically, optically, or thermally tunable. An exemplary tunable lumped dispersion adjustment module 28 includes a device that causes light to make a double-pass reflection off a diffraction grating, wherein the incidence angle on the grating may be adjusted to tune the produced change in the cumulative dispersion. Other exemplary tunable second lumped dispersion adjustment modules 28 may use dispersion-tunable devices already described with respect to the first lumped dispersion adjustment module 22.

Both of the first and second lumped dispersion adjustment modules 22, 28 are spatially localized devices, i.e., lumped devices. Herein, all linear dimensions of lumped optical devices, i.e., their linear dimensions in 3D space, are less than 1 kilometer and preferably are less than about 100 meters. In general, a lumped device is small enough to be located inside a physical building rather than having to be extended along the entire fiber transmission span of an optical communication system. For example, the first and second lumped dispersion-change modules 22, 28 may be made of rolls of optical fiber or double-pass reflective grating devices that can be conveniently stored in an area whose linear dimensions are less than 10 meters.

The optical filters are configured to remove undesired light and may be located at various locations in the apparatus 20. For example, the optical filter 34 may be configured to remove pump light and/or input light from the optical output 36 of the optical wavelength converter 24. The optical filter 34 may be configured to stop pump light from reflecting back via optical input 38 of the optical wavelength converter 24.

Figure 3:
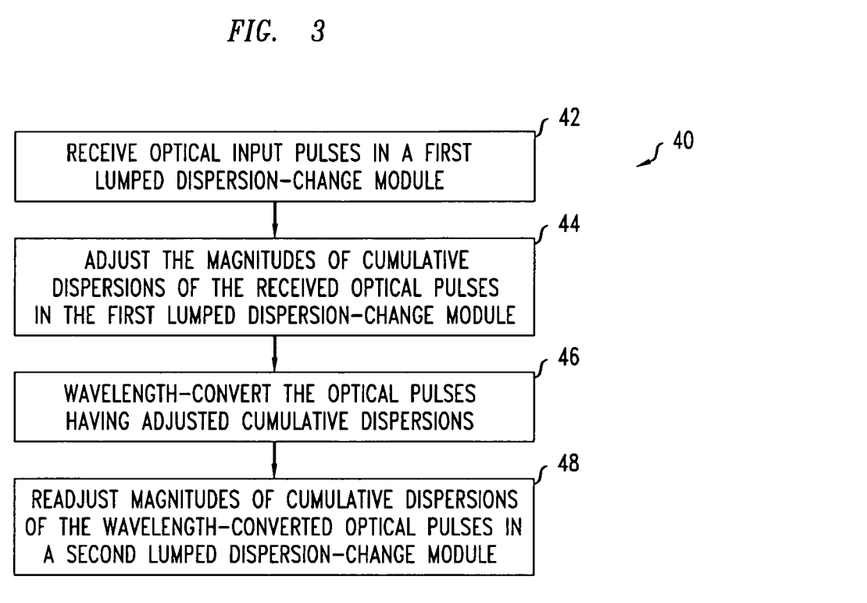
FIG. 3 is a flow chart for a method of performing optical wavelength-conversion, e.g., using the optical wavelength converter of FIG. 2.

FIG. 3 illustrates a method 40 of performing optical wavelength-conversion, e.g., with the optical apparatus 20 of FIG.

Figure 4:
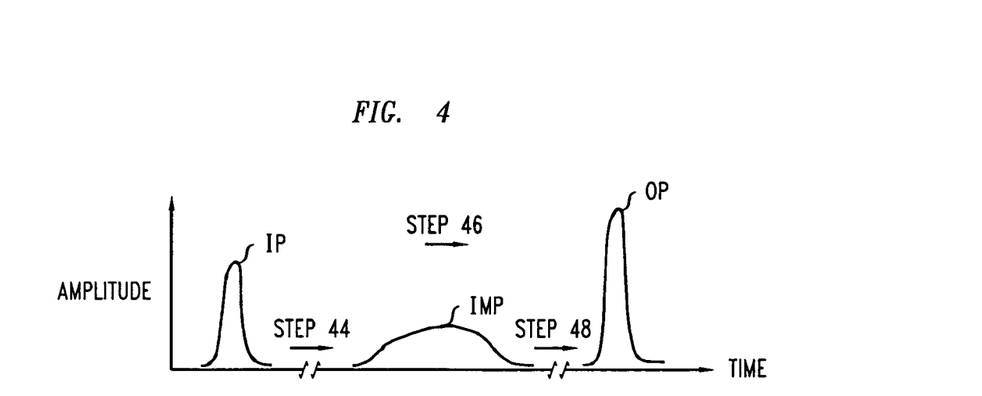
FIG. 4 schematically illustrates the evolution of an exemplary optical pulse when processed by a specific embodiment of the method of FIG. 3.

2. In a specific embodiment of the method 40, an exemplary optical pulse of one wavelength-channel evolves as schematically shown in FIG. 4.

The method 40 includes receiving optical input pulses in a first lumped dispersion-adjustment module, e.g., the module 22 (step 42). The first dispersion-adjustment module substantially adjusts the magnitude of the cumulative dispersion of a received optical input pulse IP to produce a corresponding optical intermediate pulse IMP whose cumulative dispersion has a preselected magnitude (step 44). Exemplary adjustments to cumulative dispersions of some of the optical input pulses at some telecommunications wavelengths are 50 ps/nm or more or even 100 ps/nm or more.

The preselected magnitudes of the finally adjusted cumulative dispersions in ps/nm may be greater than or equal to about $0.25 \times 10^5/(BR)^2$ or greater than or equal to about $0.5 \times 10^5/(BR)^2$. Here, BR is the square of the per wavelength-channel optical bit-rate in Gb/s, i.e., via amplitude, phase, or another type of modulation. The preselected magnitudes for the adjusted cumulative dispersions in ps/nm may also be less than or equal to about $4 \times 10^5/(BR)^2$ or are less than about $2 \times 10^5/(BR)^2$, e.g., $10^5/(BR)^2$ where BR is the square of the per wavelength-channel optical bit-rate in Gb/s. Some experiments provide evidence that lower bit error rates may result when optical pulses are introduced into pumped optical medium of optical wavelength converters with cumulative dispersions in the range of about $0.25 \times 10^5/(BR)^2$ to $4 \times 10^5/(BR)^2$.

The method 40 includes wavelength-converting the optical intermediate pulses to produce corresponding output optical pulses with different center wavelengths (step 46). The optical intermediate pulses have cumulative dispersions of substantially larger magnitude or substantially smaller magnitude than corresponding ones of the optical input pulses, i.e., input pulses that produced the intermediate pulses. In embodiments where the optical intermediate pulse IMP has a cumulative dispersion of substantially larger magnitude than the corresponding input optical pulse IP, the optical intermediate pulse IMP will typically have a larger temporal width. Due to the larger temporal width, the peak intensity of the optical intermediate pulse IMP will be substantially smaller than that of the corresponding input optical pulse IP. Due to the smaller peak amplitude, nonlinear optical effects will produce smaller amplitude optical pulses via inter-channel crosstalk processes during the optical wavelength-conversion of step 46. Thus, ratios of peak amplitudes of crosstalk-produced optical output pulses to peak amplitudes of the desired wavelength-converted output optical pulses are much smaller than they would have been if the magnitudes of cumulative dispersions of the input optical pulses had not been adjusted prior to step 46.

Next, the method 40 includes substantially readjusting magnitudes of the cumulative dispersions of the wavelength-converted optical pulses thereby producing optical output pulses (step 48). The readjusting step may return the cumulative dispersions of the wavelength-converted optical pulses substantially to those of the corresponding optical input pulses. For example, the readjusting step may reduce magnitude of the cumulative dispersion so that some optical output pulse OP is temporally narrower and has a larger peak amplitude than the corresponding wavelength-converted optical pulse.

The apparatus 20 of FIG. 2 and method 40 of FIG. 3 may be incorporated into all-optical communication lines that perform wavelength-conversion. Examples of such all-optical communication lines include all-optical WDM fiber transmission lines with optical cross-connects (OCXs) and/or optical add/drop multiplexers (OADMs) and long-haul optical fiber transmission lines. See e.g., U.S. patent application Ser. Nos. 10/442,287 and 10/441,532, by Aref Chowdhury et al, filed May 20, 2003; and U.S. patent application Ser. Nos. 10/729,153; 10/835,753; and 10/932,980, filed by Aref Chowdhury et al on Dec. 5, 2003; Apr. 30, 2004; and Sep. 2, 2004, respectively, all of which are incorporated herein by reference in herein entirety.

Figure 5:
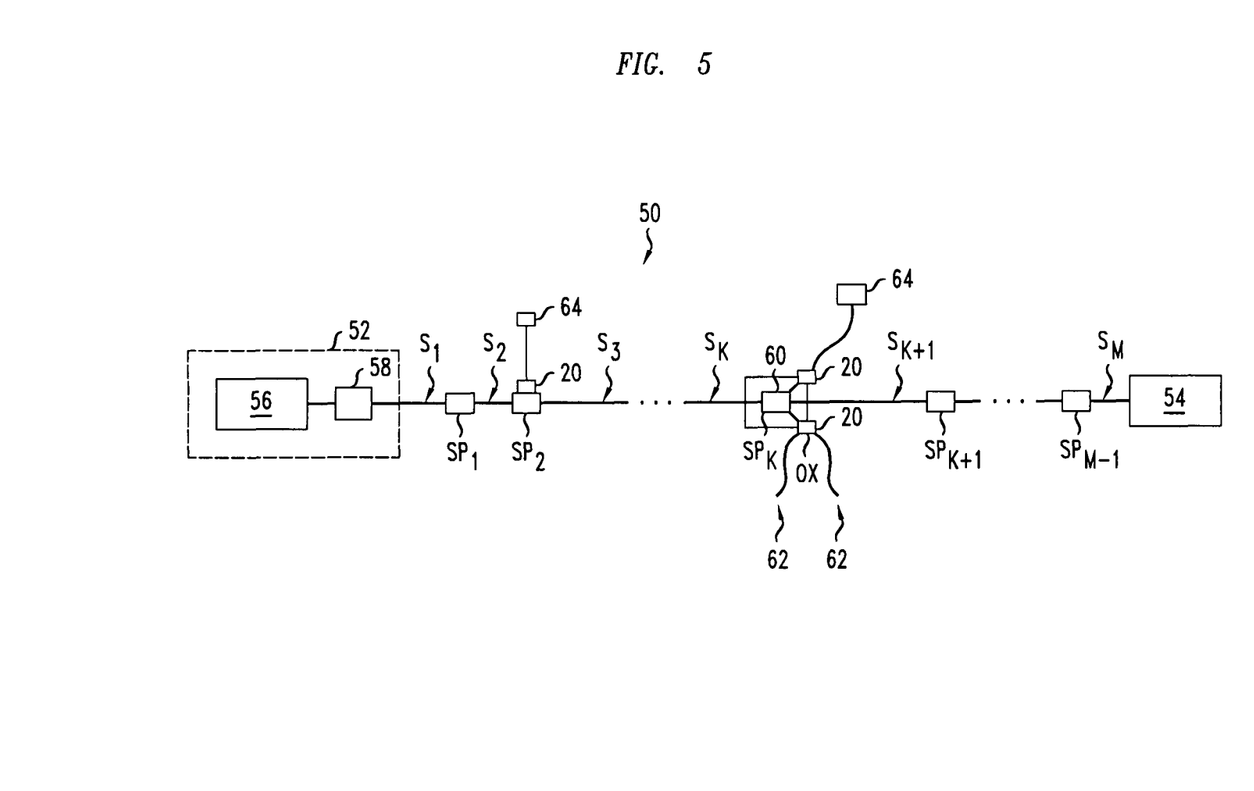
FIG. 5 illustrates an embodiment of an optical fiber communication line that includes the optical-wavelength converters of FIG. 2.

FIG. 5 shows one embodiment of such an all-optical WDM communication line 50. The all-optical WDM communication line 50 includes a multi-channel optical transmitter 52, a multi-channel optical receiver 54, and a series of optical fiber transmission spans $S_1, S_2, S_3, \ldots, S_k, S_{k+1}, \ldots, S_M$ connecting the optical transmitter 52 to the optical receiver 54. The transmitter 52 includes a multi-channel optical pulse source 56 and an optical dispersion pre-compensator 58. Adjacent ones of the optical fiber transmission spans $S_1$-$S_M$ are connected via all-optical signal processors $SP_1, SP_2, \ldots, SP_k, SP_{k+1}, \ldots, SP_{M-1}$. The all-optical signal processors $SP_1$-$SP_{M-1}$ may include optical amplifiers and/or dispersion compensators serially connected to the optical amplifiers therein. One or more of all-optical signal processors $SP_1$-$SP_{M-1}$ has an OXC and/or OADM 60 that connects the all-optical communication line 50 to other optical fiber transmission lines 62 and/or optical transceivers 64. These particular all-optical signal processors $SP_2$, $SP_k$ also includes apparatus 20, which optically wavelength-converts optical pulses received from and/or transmitted to directly adjacent optical fiber transmission spans, e.g., spans $S_K$ and $S_{K+1}$, in the all-optical WDM communication line 50.

Figure 6:
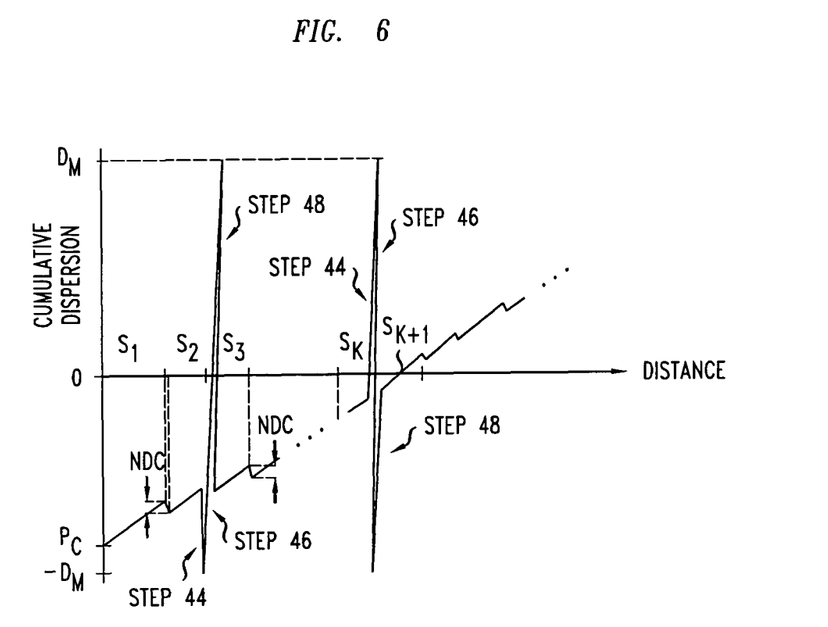
FIG. 6 schematically illustrates the evolution of the cumulative dispersion of optical pulses in a specific embodiment of the optical fiber communication line of FIG. 5.

FIG. 6 illustrates how cumulative dispersions of optical pulses evolve in an exemplary embodiment of the all-optical WDM communication line 50 of FIG. 5. In this embodiment, cumulative dispersions are managed to evolve along a selected exemplary dispersion map. In exemplary dispersion map, the cumulative dispersions receive a negative pre-compensation PC in the optical precompensator 58, evolve linearly along individual ones of the optical fiber spans $S_1$-$S_M$, and receive negative dispersion compensations NDC in various ones of the all-optical signal processors $SP_1$-$SP_{M-1}$.

The cumulative dispersions of optical pulses have undesirable magnitudes at inputs of some of the all-optical processors, e.g., processors $SP_2$ and $SP_k$. At these inputs, magnitudes of the cumulative dispersions are outside of ranges that seem to reduce the production of crosstalk during wavelength-conversion. In particular, there is some evidence that the production of such crosstalk may be reduced in WDM systems if the magnitudes of cumulative dispersions are kept in the range of about $0.25 \times 10^5/(BR)^2$ to $4 \times 10^5/(BR)^2$ during wavelength-conversion. The undesirable magnitudes of the input cumulative dispersions may, e.g., result from the positions of the all-optical signal processors $SP_2$, $SP_k$ along the selected dispersion map.

To compensate for such undesirable input dispersions, the all-optical signal processors $SP_2$, $SP_k$ include the apparatus 20 of FIG. 2. In the all-optical processors $SP_2$, $SP_k$, the apparatus 20 are configured to adjust the magnitudes of cumulative dispersions in step 44 to have values, Dm, within the desired range for wavelength-conversion and to wavelength-convert such adjusted optical pulses at step 46. In such ranges, the cumulative dispersions of optical pulses may be outside of the ranges for cumulative dispersions of corresponding optical pulses in the optical fiber spans directly connected by the all-optical signal processors $SP_2$, $SP_k$. The wavelength-conversion step 46 may or may not include an optical phase conjugation that inverts cumulative dispersions. In the all-optical processors $SP_2$, $SP_k$, the apparatus 20 are also configured to readjust magnitudes of the cumulative dispersions of wavelength-converted optical pulses to ranges for said dispersions in the optical fiber spans directly connected by the all-optical signal processors $SP_2$ and $S_k$.

In various embodiments of the optical communication line 50, different ones of the all-optical signal processors $SP_2$ and $SP_k$ may require apparatus 20 that provide different adjustments to the magnitudes of input cumulative dispersions. For that reason, it may be advantageous to incorporate embodiments of the device 20 that are dispersion-tunable in the all-optical signal processors $SP_2$ and $SP_k$ that have optical wavelength converters, e.g., processors with OXCs, OADMs, or optical phase converters.

FIGS. 7A-7D show measured spectra of output optical pulses produced by optically processing substantially identical input optical pulses having bit-rates, i.e., pulse rates of 40 Gb/s, i.e., 40 giga-bits-per-second. The optical processing included increasing the magnitude of input optical pulse's cumulative dispersion to a selected value and then wavelength-converting the input optical pulse.

FIGS. 7A, 7B, 7C, and 7D plot exemplary output spectra from an optical wavelength converter in a multi-channel system. The output spectra were produced by setting cumulative dispersions increases at the input of the optical wavelength converter to be about 0 ps/nm, 45 ps/nm, 80 ps/nm, and 115 ps/nm, respectively. Each output spectrum has a pump peak at a wavelength of about 1554 nm, a first wavelength-converted peak at a center wavelength of about 1551.9 nm, and another wavelength-converted peak for a nearby second channel (not shown). Here, input optical pulses had a carrier-suppressed return-to-zero format so that output peaks included a tone on each side of the center wavelength of the output optical pulse. The optical pump power was about 100 milli-watts, and the input optical signal power was about 20 milli-watts per wavelength-channel.

Figure 7A:
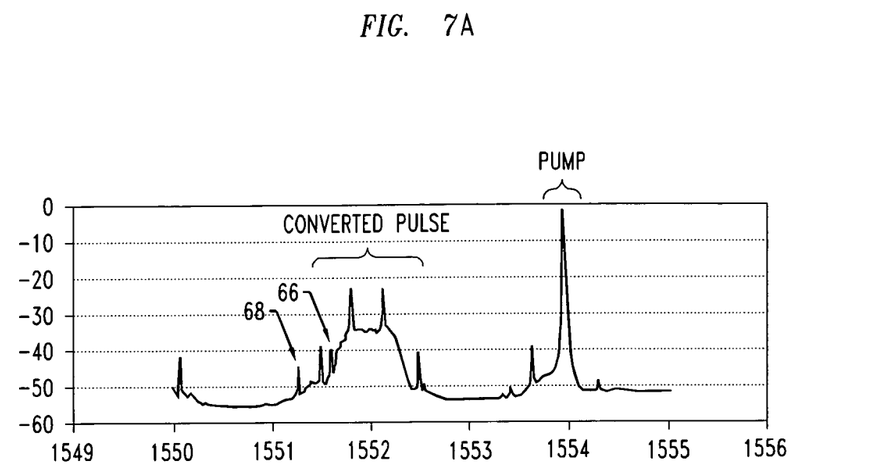
FIGS. 7A-7D show spectra of optical pulses produced by wavelength-converting optical pulses having different amounts of cumulative dispersion.

Referring to FIG. 7A, the output spectra has large amplitude peaks 66, 68 for cumulative dispersions of about 0 ps/nm at the input of the optical wavelength converter. The amplitude peaks 66, 68 were produced by inter-channel crosstalk during wavelength-conversion.

Figure 7B:
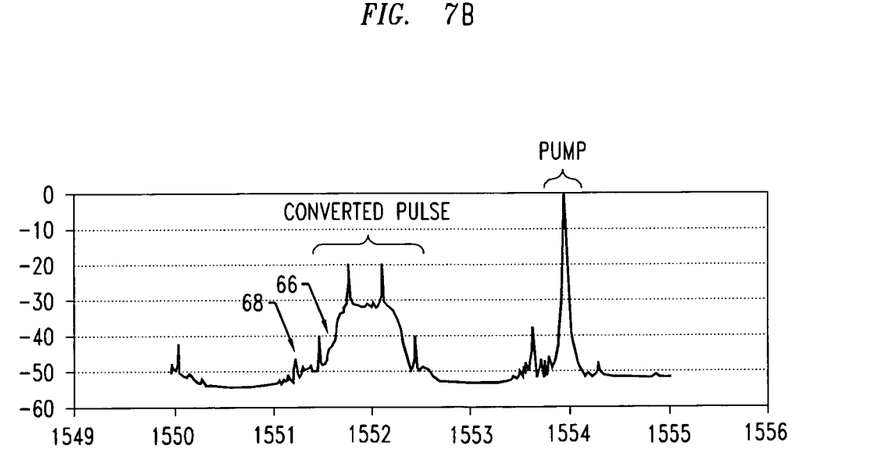
Figure 7C:
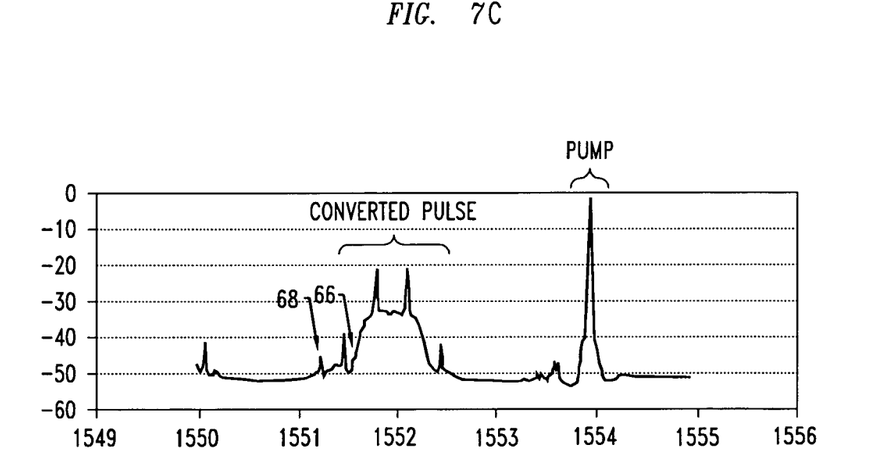
Figure 7D:
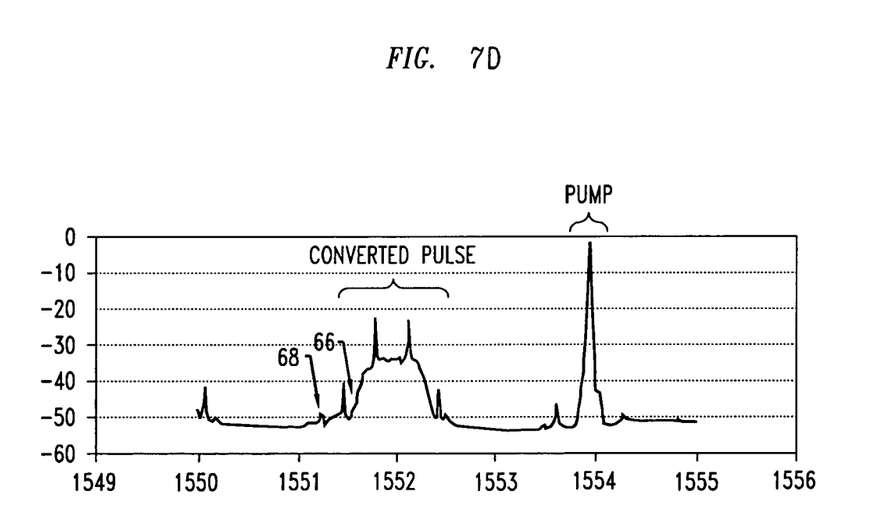

Referring to FIGS. 7B-7D, the output spectra have significantly smaller amplitude peaks 66, 68, e.g., at least about 5 decibels smaller than in FIG. 7A. The smaller amplitudes of the peaks 66, 68 are associated with larger magnitudes for the cumulative dispersions at the input of the optical wavelength converter.

A comparison of the spectra of FIGS. 7A-7B shows that some telecom-wavelength optical pulses at 40 giga-bits-per-second produce reduced inter-channel crosstalk when magnitudes of their cumulative dispersions are about 45 ps/nm or more during optical wavelength-conversion.

From the disclosure, drawings, and claims, other embodiments of the invention will be apparent to those skilled in the art.

What we claim is:

1. An optical fiber transmission system, comprising:
    a series of optical fiber transmission spans connected to form an optical communication path; and
    one or more all-optical signal processors, each processor directly connecting a corresponding adjacent pair of the spans and comprising:
        an optical wavelength converter having input and output ports and being connected to convert multiple optical wavelength channels, the optical wavelength converter being configured to convert one of the optical wavelength channels of the system to have a center wavelength nearer to a pump wavelength of the optical wavelength converter than the inter-channel crosstalk produced by the pump in the optical wavelength converter; and
        a lumped dispersion adjustment module being connected to the input port of the wavelength converter of the same processor.

2. The system of claim 1, wherein the lumped dispersion adjustment module is configured to adjust cumulative dispersions of some received optical pulses to values outside of a range for the cumulative dispersions of corresponding optical pulses in the span directly following the same processor in the series.

3. The system of claim 2, wherein each processor has a second lumped dispersion adjustment module connected to the output port of the optical wavelength converter of the same processor and configured to reset cumulative dispersions of some received wavelength-converted optical pulses to be within ranges for the cumulative dispersions of corresponding optical pulses in the span directly following the same processor.

4. The system of claim 3, further comprising an optical transmitter configured to transmit optical pulses to the spans over a plurality of the optical wavelength channels.

5. The system of claim 3, wherein the first and second lumped dispersion adjustment modules are capable of tunably changing a magnitude of a cumulative dispersion of received optical pulses.

6. The system of claim 2, wherein the lumped dispersion adjustment module is configured to adjust cumulative dispersions of the some received optical pulses to have values in pico-seconds per nanometer that are greater than about $0.25 \times 10^5$ over the square of the per wavelength-channel bit-rate in giga-bits per second.

7. The system of claim 6, wherein the lumped dispersion adjustment module is configured to adjust cumulative dispersions of the some received optical pulses to have values in pico-seconds per nanometer between about $0.5 \times 10^5$ over the square of the per wavelength-channel bit-rate in giga-bits per second and about $4 \times 10^5$ over the square of the per wavelength-channel bit-rate in giga-bits per second.

8. The system of claim 2, wherein a second of the processors directly connects a corresponding adjacent pair of the spans and comprises:
    a second optical wavelength converter having input and output ports; and
    a second lumped dispersion adjustment module configured to transmit optical pulses to the input port of the wavelength converter of the second of the processors and to adjust cumulative dispersions of some received optical pulses to be outside of ranges for cumulative dispersions of corresponding optical pulses in spans directly connected by the second of the processors.

9. The system of claim 8, wherein the second of the processors has another lumped dispersion adjustment module connected to the output port of the second optical wavelength converter and configured to reset cumulative dispersions of some received wavelength-converted optical pulses to be in ranges for cumulative dispersions of corresponding optical pulses in spans directly connected by the second of the processors.

10. The system of claim 8, wherein the second lumped dispersion adjustment module is configured to adjust cumulative dispersions of the some received optical pulses to have values in pico-seconds per nanometer between about $0.25 \times 10^5$ over the square of the per wavelength-channel bit-rate in giga-bits per second and about $4 \times 10^5$ over the square of the per wavelength-channel bit-rate in giga-bits per second.

11. The system of claim 1, wherein the first lumped dispersion adjustment module is capable of tunably changing a magnitude of a cumulative dispersion of received optical pulses.

12. The system of claim 1, wherein the lumped dispersion adjustment module is configured to adjust cumulative dispersions of some received optical pulses to values outside of a range for the cumulative dispersions of corresponding optical pulses in the span directly preceding the same processor.

13. An optical fiber transmission system, comprising:
a series of optical fiber transmission spans connected to form an optical communication path; and
one or more all-optical signal processors, each all-optical signal processor directly connecting a corresponding pair of the spans and comprising:
an optical wavelength converter having optical input and output ports; and
a lumped dispersion module being configured to transmit received optical pulses to the optical input port of the wavelength converter in the same processor and to adjust cumulative dispersions of some of the received optical pulses to have values in pico-seconds per nanometer greater than about $0.25 \times 10^5$ over the square of the per wavelength-channel bit-rate in giga-bits per second; and
wherein the wavelength converter is connected to receive multiple optical wavelength channels and is configured to convert one of the optical wavelength channels of the system to have a center wavelength nearer to a pump wavelength of the optical wavelength converter than the inter-channel crosstalk produced by the pump in the optical wavelength converter.

14. The system of claim 13, wherein the lumped dispersion adjustment module is configured to adjust cumulative dispersions of the some of the received optical pulses to have values in pico-seconds per nanometer that are less than about $4.0 \times 10^5$ over the square of the per channel bit-rate in giga-bits per second.

15. The system of claim 14, wherein the lumped dispersion adjustment module is configured to adjust cumulative dispersions of the some of the received optical pulses to have values in pico-seconds per nanometer that are greater than about $0.5 \times 10^5$ over the square of the per channel bit-rate in giga-bits per second.

16. The system of claim 14, wherein each of the one or more all-optical signal processors comprises a second lumped dispersion adjustment module connected to receive optical pulses from the optical output of the wavelength converter of the same all-optical signal processor.

17. The system of claim 14, wherein the system is a WDM optical transmission system and includes at least two of the all-optical signal processors.

18. The system of claim 17, wherein each of the two signal processors comprises one of an optical cross-connect and an optical add/drop multiplexer.

* * * * *